United States Patent [19]

Sandberg et al.

[11] 4,054,967
[45] Oct. 25, 1977

[54] FOOD PATTY MOLDING MACHINE

[75] Inventors: Glenn A. Sandberg, Lockport; Louis R. Richards, Mokena; James W. Stoub, Oak Forest, all of Ill.

[73] Assignee: Formax, Inc., Mokena, Ill.

[21] Appl. No.: 623,986

[22] Filed: Oct. 20, 1975

[51] Int. Cl.$^2$ ............................................. A22C 7/00
[52] U.S. Cl. ............................................ 17/32; 17/45; 426/513
[58] Field of Search ............... 17/32, 45; 99/450.7; 425/427, 233, 236; 100/218, 178, 179; 426/513

[56] References Cited

U.S. PATENT DOCUMENTS

| 3,293,688 | 12/1966 | Holly | 17/32 |
| 3,555,592 | 1/1971 | Anhanger | 17/32 |
| 3,654,665 | 4/1972 | Holly | 17/32 |
| 3,676,036 | 7/1972 | Rossi | 99/450.7 |
| 3,887,964 | 6/1975 | Richards | 17/32 |
| 3,913,175 | 10/1975 | Peterson | 17/32 |
| 3,943,601 | 3/1976 | Kuhlman | 17/32 |

Primary Examiner—John F. Pitrelli
Assistant Examiner—Paul J. Hirsch
Attorney, Agent, or Firm—Kinzer, Plyer, Dorn & McEachran

[57] ABSTRACT

A method and apparatus for molding food patties, utilizing a pump with a tall, narrow, elongated pump chamber, an outlet port extending along one edge of the chamber, and a wide access port at one side of the chamber. A supply of hamburger or other poor-flowing food product is maintained in a position completely blocking the pump access chamber and can be drawn into the chamber by rapidly withdrawing a plunger from the chamber past the access port. A hydraulic drive powers the plunger, in synchronism with a mold plate cyclically moving into and out of a fill position beneath the outlet port; the hydraulic drive causes the plunger to pump food out of the pump chamber and into mold cavities in the mold plate under a constant pressure, with the hydraulic pumps of the drive cut off immediately following filling of the molds.

16 Claims, 10 Drawing Figures

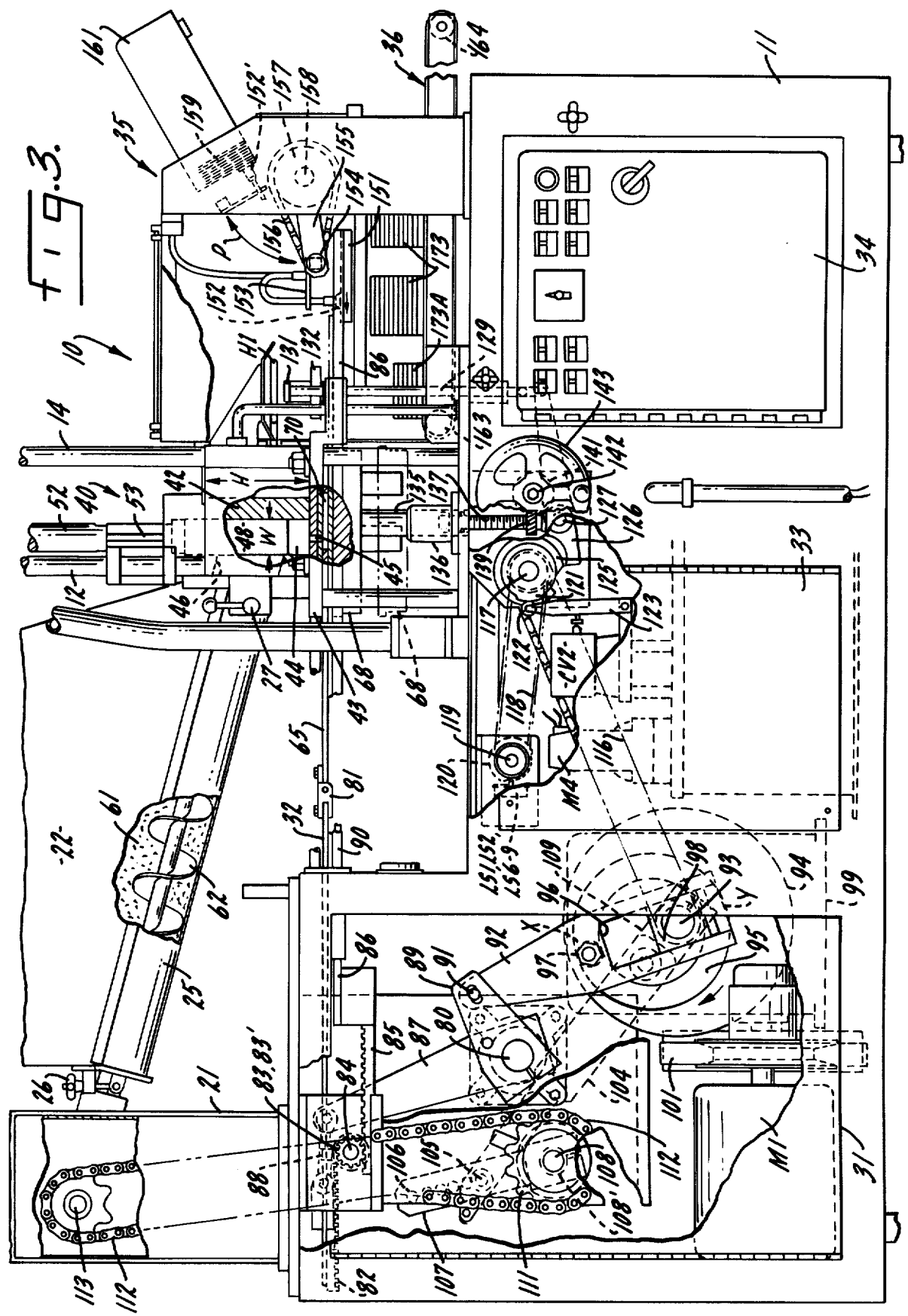

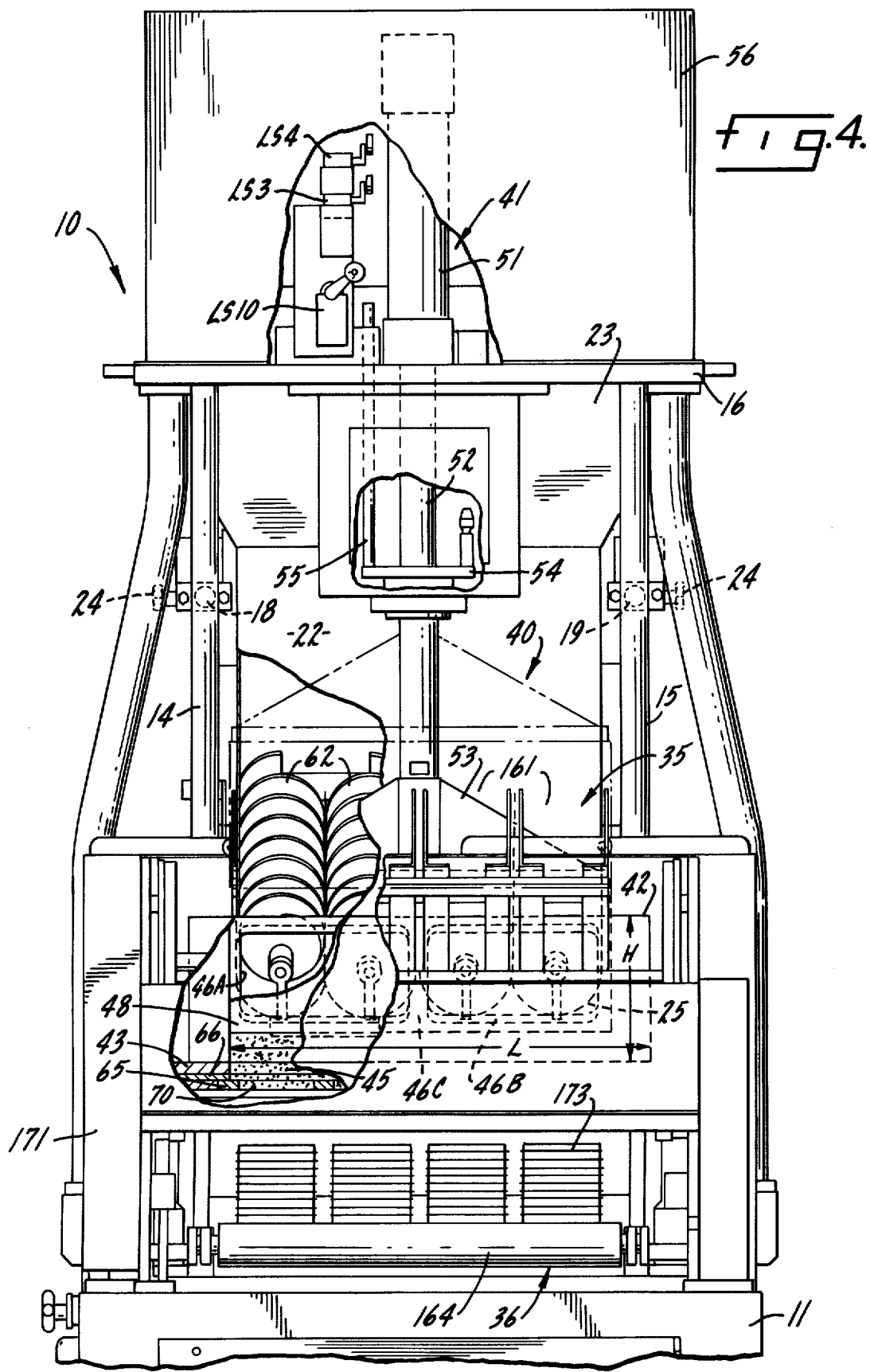

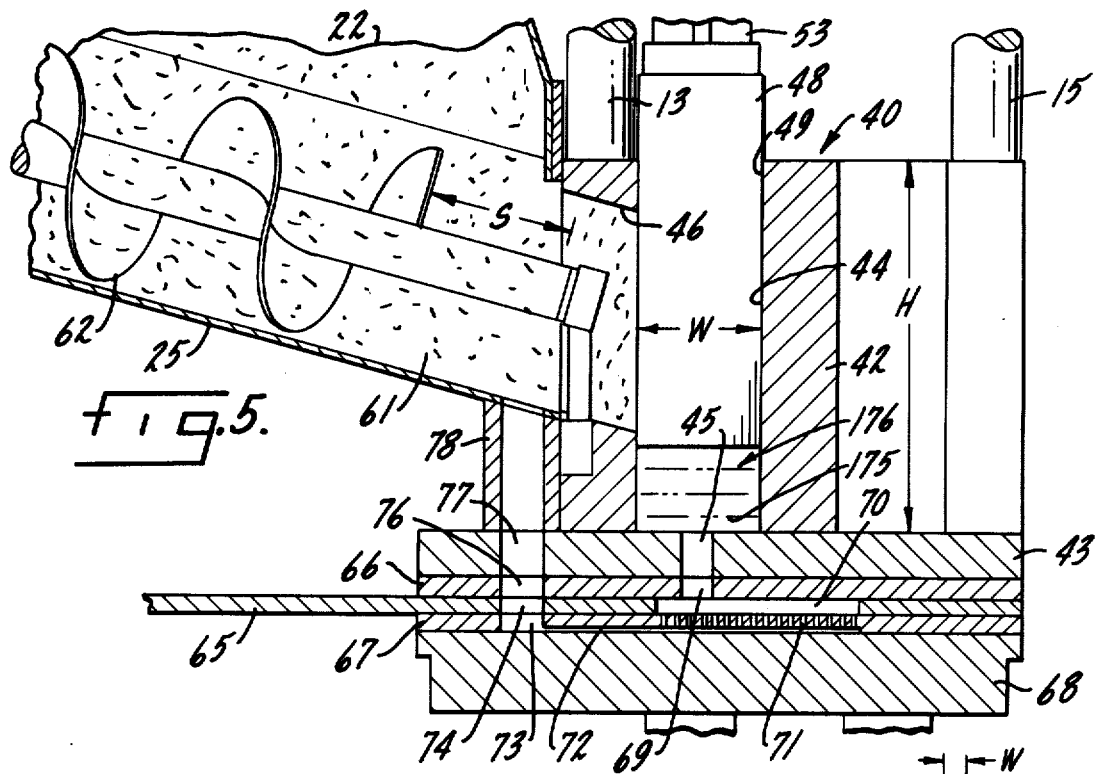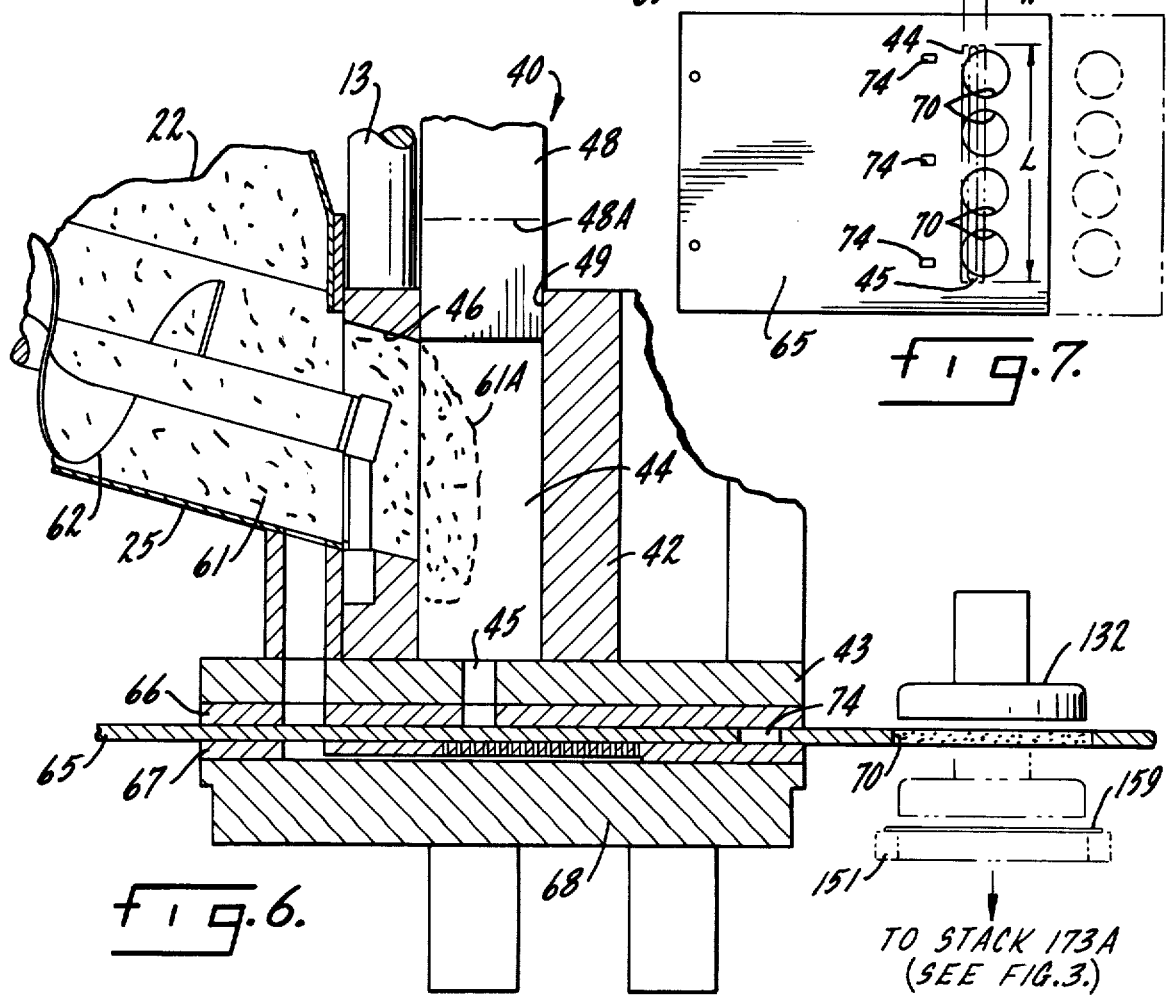

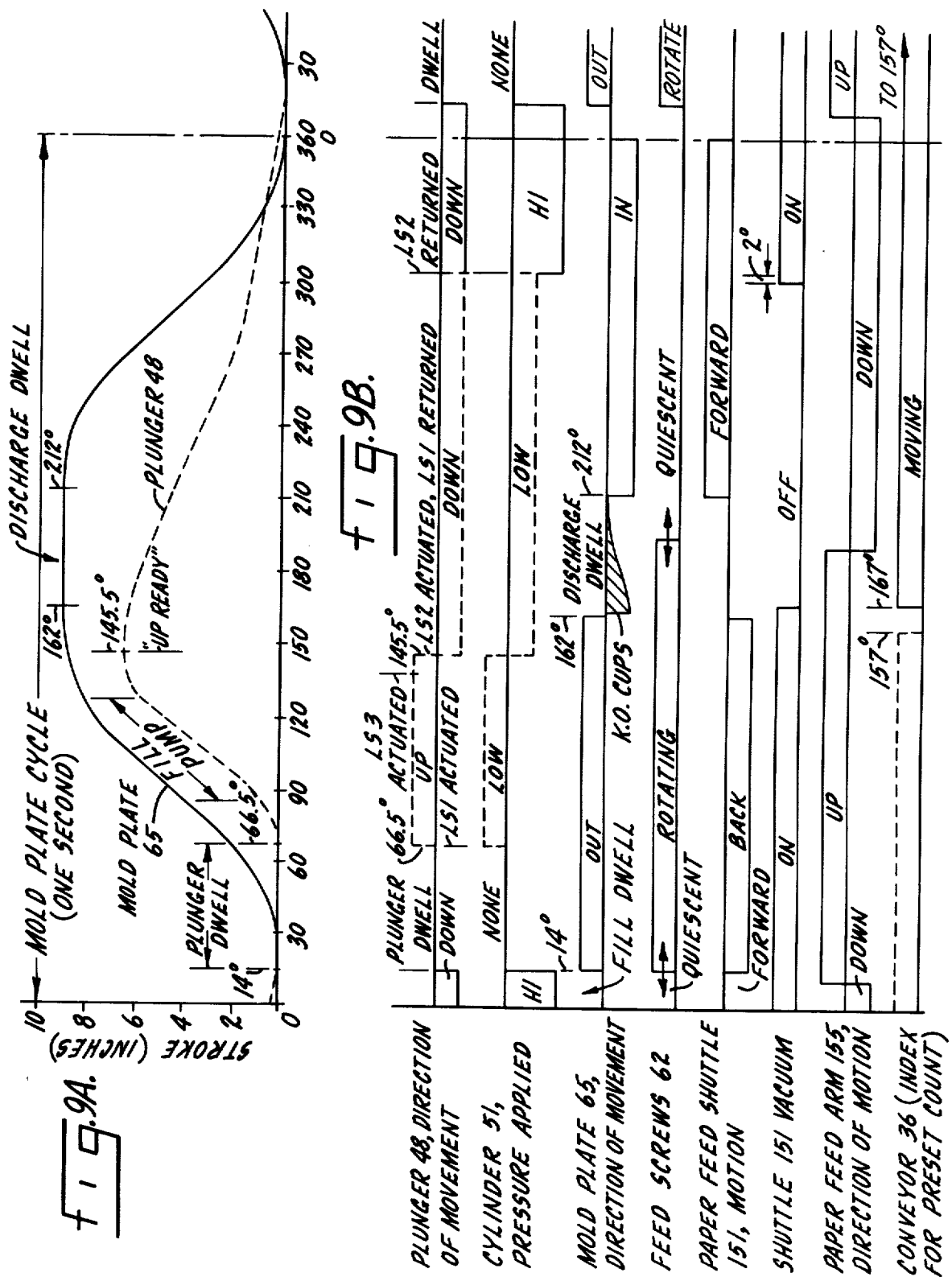

FOOD PATTY MOLDING MACHINE

BACKGROUND OF THE INVENTION

It has become common practice to manufacture food patties at a central location for distribution to restaurants, fast-food establishments, and other retail outlets including grocery stores. The most prevalent food patties, by far, are hamburger patties molded from gound meat. Other food products are also processed by the same techniques, however, including fish patties, patties formed from flaked or shredded meat, and even patties formed from vegetable foods. The term "food product", as used throughout this specification and the appended claims, is intended to refer to any of the various foods identified above and to any others having similar properties; the food products processed under the invention are not free-flowing, but are quite viscous and resistant to flow, and are only moderately compressible.

In molding food patties, a supply of the food product from which the patties are to be formed is usually maintained in a hopper or similar container. From the hopper the food product is fed to a food pump. Most applications employ a positive feed mechanism that effectively forces the food product from the supply into the pump intake, due to the viscous, flow resistant propeties of the food product. The pump forces the food product, under pressure, into a mold cavity in a mold plate. The mold plate is moved through a cyclic motion, rotary or reciprocating, between a fill position at which it receives food product from the pump and a discharge position at which the food patty is discharged from the mold cavity. In most instances, a 1:1 ratio is maintained between the cyclic operations of the mold plate and the pump. On the other hand, much higher ratios have been used, employing pumps with a capacity substantially greater than that of the mold cavities filled in each pump cycle; see U.S. Pat. No. 3,887,964.

One of the problems presented in conjunction with conventional food patty molding techniques, as briefly discussed above, results from "tumbling" or "churning" of the food product by the feed mechanism that supplies the food product to the pump. This results from the positive feeding action used to force the food product into the pump intake, and the attendant difficulty in avoiding circulatory flow because the feed mechanism cannot be precisely matched to the intake capacity of the pump. This "churning" may cause separation of the food product (e.g., separation of fat from other tissue in ground meat, or separation of water from a fish food product). In addition, the churning effect of the feeder mechanism may grind the food product into smaller particles than desired. In both instances, an undesired deterioration of the food product may result.

Another common problem presented in conventional food patty molding operations is the formation of undesirable bulges or "lips" on the food patties. It is customary to force the food product into the mold cavity under substantial pressure. Air entrained in the food product tends to expand when the food patty is first exposed to atmospheric pressure. This expansion occurs unevenly, concentrated in the portion of the patty that is first exposed. In some food patty molding machines, special post-molding expedients have been adopted to minimize the formation of these bulges on the patties (see U.S. Pat. No. 3,479,687), introducing additional complexity and expense in the manufacture and maintenance of the food patty molding equipment. Furthermore, these bulge-elimination expedients have not been uniformly successful.

Because the food products to which the present invention is directed exhibit poor flow characteristics, it has usually been necessary to utilize high pressures in patty molding equipment affording high volume production; thus, in commercial embodiments of the patty molding machine of U.S. Pat. No. 3,887,964, pressures as high as 400 pounds per square inch may be employed. The pressure requirements are particularly high whenever any valving is interposed between the food pump and the mold cavities. These high pressure levels may produce some deterioration of the food product, of the kind discussed above with respect to churning by the pump feed apparatus, and may also add materially to the overall cost of the molding equipment.

SUMMARY OF THE INVENTION

It is a principal object of the present invention, therefore, to provide a new and improved method and apparatus for rapid, efficient, high volume manufacture of molded food patties that effectively and inherently minimizes or eliminates the difficulties and disadvantages of previously known patty molding techniques.

It is a specific object of the invention to provide a new and improved method and apparatus for molding food patties that eliminates the necessity for a positive feed to force a viscous, flow-resistant food product into the food pump. A particular feature of the invention pertaining to this object is the provision of a pump feeder apparatus that terminates well short of the intake or access port of the food pump, in conjunction with a food pump having a large access port and operated at a plunger speed that develops an appreciable vacuum to draw the food product through only a short distance into the pump when required.

Another object of the present invention is to provide a new and improved method and apparatus for molding food patties that effectively and inherently minimizes pressure losses between the food pump and the mold cavities, thereby improving the efficiency of the patty molding operation and reducing the cost and complexity of the molding equipment.

Another object of the invention is to provide a new and improved method and apparatus for molding food patties that effectively and inherently eliminates or minimizes the formation of undesired bulges or "lips" on the food patties without requiring any special equipment for processing of the patties subsequent to filling of the mold cavities. A particular feature of the invention relating to this object is the utilization of a hydraulic drive for the food pump that affords a release dwell in the cyclic operation of the pump drive, this dwell occurring at the end of the filling of the mold cavities.

Another object of the invention is to provide a new and improved method and apparatus for molding food patties in high volumes that is inherently efficient, requires a minimum of capital expenditure in relation to capacity, and also minimizes maintenance expenses.

Accordingly, in one aspect the invention relates to a food patty molding machine, comprising a pump housing enclosing a tall, narrow, elongated pump chamber having an outlet port extending longitudinally of one edge of the chamber and an access port extending longitudinally of one side of the chamber, the access port having a height greater than the width of the pump chamber. The machine further comprises a mold plate including a plurality of mold cavities, and a mold plate drive for cyclically moving the mold plate between a fill position, in which the mold cavities are aligned with the outlet port, and a discharge position, in which the mold cavities are displaced from the outlet port, with a dwell interval at each position. Supply means are provided for continuously maintaining a supply of food product completely covering the access port. A plunger projects into the pump chamber through the edge opposite the outlet port; the plunger is movable between an intake position, displaced from the outlet port to a point clear of the access port, and a range of pressure positions, in which the plunger extends past and closes the access port. The machine further includes plunger drive means, comprising a reversible fluid pressure motor connected to the plunger and fluid pressure means for supplying fluid, under pressure, to the motor. Control means are provided for actuating the plunger drive means through an operating cycle synchronized with the mold plate cycle, moving the plunger from its pressure position range to its intake position and back into its pressure position range during a period in which the mold plate is displaced from its full position, the plunger moving toward its intake position at a speed sufficient to develop a partial vacuum in the chamber and thereby draw food product from the supply means a short distance through the access port with no appreciable external impetus.

In another aspect, the invention relates to a method of molding food patties comprising the following steps performed in a repeating cycle:

A. continuously maintaining a supply of food product in a position completely blocking a large-area access port leading directly into a narrow pump chamber of substantial height;

B. rapidly withdrawing a plunger from the chamber, past the access port, at a speed of at least 150 feet per minute, from a pressure position range within the chamber in which the plunger closes the access port, to an intake position in which the access port is open into the chamber, producing a partial vacuum in the chamber and drawing a quantity of food product a short distance from the supply through the access port into the chamber;

c. moving the plunger back into the chamber past the access port into its pressure position range, closing the access port and placing the food product under pressure within a subportion of the chamber at the opposite edge of the chamber from the plunger intake position;

D. bringing a mold cavity into a fill position in communication with an outlet port for the chamber, with the plunger in its pressure position range, to fill the mold cavity with the food product and form a food patty;

E. and moving the mold cavity away from its fill position and out of communication with the outlet port to a discharge position at which the food patty is discharged from the mold cavity.

BRIEF DESCRIPTION OF THE DRAWINGS

FIG. 3 is a side elevation view of the patty molding machine of FIG. 1 with portions of the machine cut away to reveal additional operating components;

FIG. 4 is a front elevation view of the upper portion of the patty molding machine of FIG. 1 with portions of the machine cut away to reveal additional operating components;

FIG. 5 is a detail sectional side elevation view of the food pump of the patty molding machine of FIGS. 1-4, exclusive of the pump drive, with the pump plunger in a pressure position feeding food product into a mold cavity;

FIG. 6 is a detail sectional view similar to FIG. 5 but showing the pump at an intake position;

FIG. 7 is a plan view of the mold plate for the patty molding machine of FIGS. 1-6 illustrating the relationship between the mold cavities and the outlet port of the food pump;

FIGS. 9A and 9B are motion timing charts illustrating the interrelationship between the cyclic operations of the mold plate, the food pump, and other components of the food patty molding machine, which also serve to illustrate some of the steps of the method of the invention.

DESCRIPTION OF THE PERFERRED EMBODIMENTS

The Basic Method of the Invention

Figure 1:
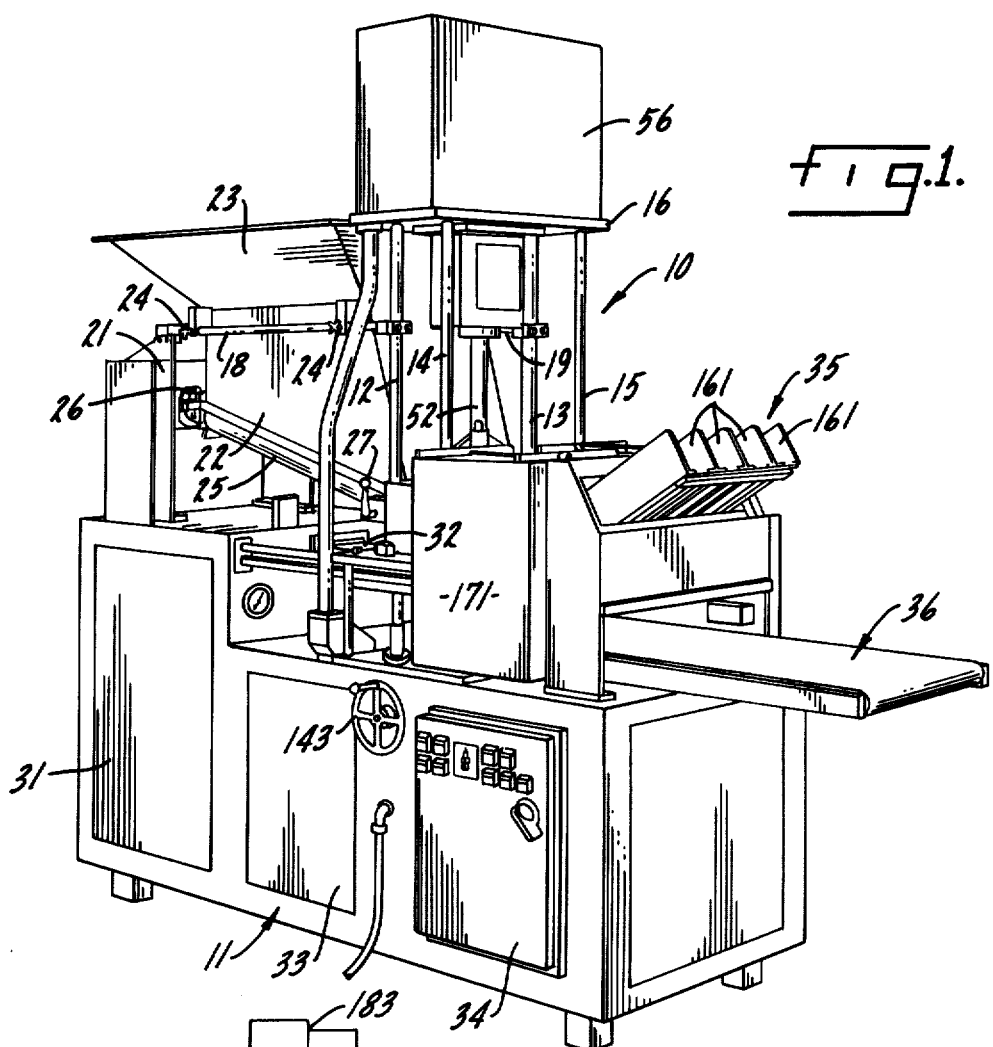
FIG. 1 is an elevation perspective view of a food patty molding machine constructed in accordance with a preferred embodiment of the invention.

In molding food patties in accordance with the method of the present invention, it is necessary to employ a food pump of the reciprocating plunger or piston type. The pump should afford a large access port for introducing food product into a narrow pump chamber, so that the food product moves through only a minimal distance in entering the pump chamber. The plunger of the pump feeds the food product from the pump chamber, under pressure, through an outlet port and directly into a mold cavity.

In carrying out the method of the invention, a supply of food product is continuously maintained in a position completely blocking the large access port that leads to the pump chamber. However, the supply means utilized for this purpose does not operate to positively force any substantial quantity of the food product into the pump chamber. The objective in maintaining the supply of food product in a blocking position with respect to the access port is to prevent having the access port open to the atmosphere.

To introduce food product into the pump chamber, the pump plunger is rapidly withdrawn from the chamber, past the access port, from a pressure position range within the chamber in which the plunger closes the access port to an intake position in which the access port is open into the chamber. The rapid withdrawal of the plunger from the chamber produces a partial vacuum and draws a quantity of food product a short distance from the supply through the access port into the chamber. The speed of withdrawal of the plunger is important; if a relatively low speed is utilized, as in conventional pumps, the requisite vacuum will not be developed, and the quantity of food product entering the pump chamber will be inadequate. In a practical, operative construction, the speed at which the plunger moves from its pressure position ranges to its intake position should be of the order of 150 feet per minute or more.

The basic food pump intake cycle, in the food patty molding method of the present invention, continues with movement of the plunger back into the pump chamber past the access port and into the pressure position range for the plunger. This movement closes the access port to the pump chamber, and continuing movement of the plunger into its pressure position range places the food product under pressure within a subportion of the chamber, between the access port and the outlet port.

While the food pump plunger is moving into its pressure position range, or shortly thereafter, a mold is brought into a fill position, positioning a group of mold cavities in direct communication with the outlet port from the pump chamber. As a consequence, the plunger of the pump operates to fill the mold cavities with food product from the pump chamber, forming molded food patties. After the filling operation, the mold plate is moved away from the fill position and out of communication with the outlet port to a discharge position at which the food patties are removed from the mold cavities. This completes the basic mold-filling cycle of the present invention in those instances in which the introduction of additional food product into the pump chamber is necessary.

It is preferable, in the practice of the method of the invention, to utilize a pump in which the pressure subchamber between the access port and the outlet port has a volume substantially larger than the total volume of the food cavities filled in the course of any single molding cycle. Whenever the pump affords sufficient capacity to fill the mold cavities at least twice, the next molding cycle following a complete pump intake cycle as described above is initiated by merely advancing the plunger of the pump further into its pressure position range, without moving the plunger to its intake position. With the plunger thus further advanced into the pump chamber, the mold plate is again brought to its fill position with the mold cavities in communication with the pump outlet port. As before, the movement of the mold plate into fill position may occur while the plunger is being advanced into its pressure position range. Accordingly, the mold cavities are again filled with food product to form food patties and are subsequently moved from the fill position to the discharge position, where the food patties are removed from the cavities.

In many instances, it is desirable to perform the method of the present invention utilizing a molding apparatus in which the mold plate containing the mold cavities can be changed to permit molding of food patties of substantially different sizes and thus meet varying customer needs. In a given instance, the molding equipment may provide for the filling of four mold cavities in each molding cycle, each cavity being some four inches in diameter and approximately three-eighths inch in thickness. At another time the same equipment may be required to fill six mold cavities in each molding cycle, with each cavity being approximately two and one-half inches in diameter and only one-fourth inch in thickness. It is thus seen that, depending upon the volume of the mold cavities, the quantity of food product pumped from the food pump in each molding cycle may vary to a substantial extent, by a ratio of as much as 3:1 or even more.

It is desirable to keep the number of pump intake cycles to a minimum, and to use the abbreviated cycle in which the pump plunger only advances further into its pressure position whenever possible. In equipment that is required to mold patties of different sizes and configurations it is not usually practical to control the changeover from one kind of pump cycle to the other by a counting technique. For maximum effectiveness, in practicing the method of the invention, it is desirable to sense the penetration of the pump plunger into its pressure position range. By adopting this additional step, it is a simple matter to control the pump cycle, utilizing the full intake cycle only when required. Thus, with an appropriate limit switch or other sensing device, the pumping operation can be repeated without an intake movement of the plunger in any mold plate cycle until the plunger has penetrated past a given point in the pump chamber. In any cycle immediately following one in which the plunger passes the given sensing point, a full intake movement of the pump plunger is carried out.

The preferred method of driving the pump plunger utilizes a hydraulic cylinder or other fluid pressure motor to effect the required movements of the pump plunger. With a plunger drive of this kind, the fluid pressure input to the motor is preferably shut off during a release interval comprising a part of the pumping cycle immediately following completion of movement of the plunger into its pressure position range. This release interval should coincide with the movement of the mold plate that removes the mold cavities from communication with the pump outlet port. It has been found that this release interval in the pump cycle eliminates the undesired bulges or lips that might otherwise be formed in the completed food patties. In carrying out this step of the method, it is preferable to provide some means for adjusting the duration of the release interval; this interval may require a different duration for different food products in order to assure avoidance of the formation of "lips".

The method of the present invention, as described above, eliminates churning of the food product prior to its introduction into the food pump, because no positive feeding action is required to drive the food product into the pump despite use of a thick, viscous food product such as coarsely ground or shredded meat. Instead, the food product is drawn into the pump, through only a minimal distance, primarily by the vacuum developed on rapid withdrawal of the plunger from the pump. The pump feeds directly into the mold cavities, so that pressure losses in the operation of the food pump are minimized. The pressure requirements for the pumping operation are held to a minimum, and "lips" can be effectively eliminated for virtually any food product with no requirement for processing of the food patty after the actual molding operation. The simple pump cycle and method described above is well adapted to high volume production; a mold cycle repetition rate of sixty per minute or more can be easily realized without imposing undue power requirements on the pump or on the mold plate mechanism.

A PREFERRED EMBODIMENT OF THE APPARATUS OF THE INVENTION

FIG. 1 affords a general illustration of a food patty molding machine 10 constructed in accordance with a preferred embodiment of the present invention. The molding machine 10 comprises an enclosed base 11. Near the center of base 11, four rods 12, 13, 14 and 15 project upwardly from the base to afford a vertical pump column frame capped by a plate 16. Two hopper support members 18 and 19 are affixed to and extend horizontally rearwardly from the vertical frame members 12 and 13, respectively. The members 18 and 19 terminate at a rear frame 21 that extends transversely of the rear of the machine.

A meat hopper 22 having an outwardly flared upper section 23 is mounted on support members 18 and 19, by a plurality of releasable clamps 24. Hopper 22 has a separately removable bottom 25 which slopes downwardly toward the front of machine 10, terminating adjacent the vertical column members 12 and 13. The left-hand end of the hopper bottom 25 is held in place below the main hopper body 22 by releasable clamps 26. The right-hand end of the hopper bottom 25 is held in place by a pair of cam retainers 27. Only one clamp 26 and one cam retainer 27 are shown in FIG. 1 but a corresponding construction is employed at the opposite side of machine 10.

The left-hand portion of base 11 (FIG. 1), to which access is provided by a door 31, houses a mold plate drive that is connected to a horizontally slidable mold plate yoke 32. Another door 33 in base 11 provides access to a hydraulic power unit for a food pump; the food pump itself is located at the base of the vertical column afforded by frame members 12-15. An electrical control system for patty molding machine 10 is located in the front portion of base 11, covered by a door 34. A paper interleaving mechanism 35 is mounted on the upper forward portion of base 11, above a takeaway coveyor 36.

The mechanical construction employed in molding machine 10 is illustrated in substantially greater detail in FIGS. 3-7. The molding machine includes a food pump 40, located in the front central portion of the machine, connected to a pump drive 41 supported upon the vertical column comprising the frame members 12-16, (FIG. 4). Pump 40 includes a pump housing 42 that extends transversely of machine 10 and is closed at the bottom by a plate 43. The pump housing 42 encloses a tall, narrow, elongated pump chamber 44. Thus, the height H of pump chamber 44 is several times greater than its width W; the chamber length L is several times greater than the height H.

Pump chamber 44 has an elongated outlet port 45 that extends longitudinally for the entire length L of the pump chamber (FIG. 7), the outlet port comprising a slot in the housing member 43 (FIGS. 3-6) that forms the bottom edge of the pump chamber. An access port 46 is formed in the left-hand side wall of the pump housing 42, as viewed in FIGS. 3, 5 and 6. The access port preferably has a height that is substantially greater than the width W of the pump chamber 44 and extends for virtually the entire length L of the chamber. To improve the rigidity of the pump housing, the access port 46 may be formed in two segments 46A and 46B separated by a vertical support 46C, as shown in FIG. 4.

Pump 40 further comprises a plunger 48 which projects into pump chamber 44 through a plunger opening 49 at the edge of the chamber opposite outlet port 45. In this instance, as best shown in FIGS. 5 and 6, plunger 48 extends through and seals the open top edge of pump chamber 44. The external dimensions of plunger 48 conform closely to the internal dimensions of chamber 44, except that the plunger height is preferably somewhat greater than the chamber height H.

The plunger drive means 41 for pump 40 comprises a reversible fluid pressure motor 51 connected to plunger 48. As shown in FIG. 4, the plunger drive motor 51 may constitute a double-acting hydraulic cylinder having a piston rod 52 which extends downwardly through plate 16 and is connected to plunger 48 by a connecting member 53. A collar 54 is affixed to piston rod 52; collar 54 carries a vertically extending rod 55 that is engageable with three limit switches LS3, LS4 and LS10 located within a housing 56 that encloses cylinder 51.

Molding machine 10 incorporates a food product supply means, including hopper 22, for maintaining a supply of food product 61 in a position that comletely covers the pump access port 46 and precludes exposure of the access port to the atmosphere. In addition to hopper 22, this food product supply means comprises a conveyor that extends along the bottom 25 of hopper 22, which is inclined downwardly toward access port 46. In the illustrated construction, the supply conveyor includes four feed screws 62. Each of the feed screws 62 terminates a substantial distance S from the access port (FIG. 5). A belt or other supply conveyor can be utilized if desired.

A mold plate 65 is mounted below pump 40, as shown in FIGS. 3-7. Mold plate 65, which includes a plurality of mold cavities 70, is disposed between an upper guide plate 66 and a lower guide plate 67, supported by a mold plate guide base 68 (FIGS. 5 and 6). The upper guide 66 for mold plate 65 includes an elongated aperture 69 that is aligned with and constitutes a continuation of the outlet port 45 for pump 40. A multiplicity of minute air outlet apertures 71 are formed in the lower guide plate 67, in the part of that guide plate adjacent the pump outlet port 45, 69; the air outlet apertures 71 extend for the full length of plate 67. An air passage 72 connects the apertures 71 to three vent apertures 73 in plate 67 that are aligned with corresponding apertures 74 in mold plate 65 when the mold plate is in its "fill" position as illustrated in FIG. 5. Corresponding aligned vent apertures 76 and 77 are provided in guide plate 66 and pump housing plate 43, respectively, with each of the vent passages 77 in plate 43 being connected to a tube 78 that opens into the bottom 25 of hopper 22.

The left-hand end of mold plate 65 is connected to yoke 32 by suitable connectors 81 (FIG. 3). Yoke 32 extends through the upper portion of base 11 at the left-hand side of the machine, and is connected to rack 82 disposed in meshing engagement with a gear 83 mounted upon a transverse shaft 84. At each side of the machine, an additional gear 83' mounted on shaft 84 engages another rack 85. Each of the racks 85 is connected to an elongated rod 86 slidably engaged in a fixed guide channel 90. The gears 83, 83', the racks 82 and 85, and the guide rods 86 are utilized to actuate the shutter of the vacuum sheet applicator 35 in synchronism with the cyclic, reciprocal motions of yoke 32 and mold plate 65, as described hereinafter.

An oscillating lever 87 is connected by a linkage 88 to yoke 32 (FIG. 3), the lower end of lever 87 being affixed to a shaft 80. A crank 89 is also affixed to shaft 80 and is connected by a pin-and-slot connection 91 to the end of a cam lever 92. The lower end of the cam lever 92 comprises a slide yoke 96 that engages a slide block 98 journalled upon a shaft 93.

A large cam 94 is keyed to shaft 93. Cam 94 has a cam track groove 95 formed therein, groove 95 being eccentrically oriented with respect to the axis of shaft 93. The cam track groove 95 is engaged by a cam follower roller 97 mounted upon cam lever 92. The cam track 95 is not truly circular. Rather, its contour is made to afford two limited dwell portions X and Y; during these cam dwells roller 97 remains at a constant distance from the axis of shaft 93, and the linkage 82, 87–89, 91, 92 remains stationary.

A mold plate drive motor M1 is located in the mold plate drive section of base 11 behind door 31; motor M1 drives a gear reducer 99 through a belt 101. The output shaft of gear reducer 99 is shaft 93.

The drive for the food product supply conveyor, comprising the feed screws 62, could employ a separate drive motor. In the illustrated construction, however, the mold plate drive motor M1 is used for this purpose. This drive comprises a link 104, driven from a crank arm 109 keyed to shaft 93, that oscillates arcuately about the shaft axis. The end of link 104 is connected by a pin 105 to any one of several connection apertures 106 in a lever 107 that is affixed to a shaft 108. Shaft 108 is connected to a sprocket hub 108′ that is coaxial therewith by two clutches (not shown); one of these clutches is a sprag clutch employed merely to limit the rotation of hub 108′ to one direction and the other is an electrically actuated clutch which, when disengaged, inhibits rotation of hub 108′.

A drive sprocket 111 is mounted on hub 108′ and is connected by a chain 112 to a main supply conveyor drive shaft 113. Shaft 113, in turn, is connected by suitable right angle drive gears (not shown) to each of the supply conveyor feed screws 62.

A chain drive 116 (FIG. 3) drives a knockout drive shaft 117 in 1:1 synchronized relationship with shaft 93. A belt drive 118, in turn, connects shaft 117 to a timing cam shaft 119, so that shaft 119 is also rotated in 1:1 ratio to shafts 117 and 93. Shaft 119 carries a series of cams 120, which may be of adjustable construction; the cams 120 are utilized to actuate a series of timing limit switches LS1, LS2, LS6, LS7, LS8 and LS9. The operation of these switches is described hereinafter in conjunction with FIG. 8.

A cam 121 mounted on the knockout drive shaft 117 also engages a cam follower roller 122 mounted on the end of a lever 123. Lever 123 is utilized to actuate a high pressure hydraulic control valve CV2 that is a part of the hydraulic drive for food pump 40. The operation of valve CV2 is described more fully hereinafter in conjunction with the hydraulic system illustrated in FIG. 2.

A knock-out drive cam 125 mounted on shaft 117 engages one end of a knock-out drive lever 126 that is pivotally mounted on a shaft 127. The other end of lever 126 is connected to a vertical knock-out drive rod 129, the upper end of drive rod 129 being connected to a bar 131 that extends transversely of the front end of machine 10. Bar 131 carries a plurality of knock-out cups 132 (see FIGS. 3 and 4). There is one knock-out cup 132 for each of the mold cavities 70 in mold plate 65 (FIGS 3–7).

As shown in FIG. 3, the mold plate guide base 68 is supported upon two short vertical support shafts 135 (only one is shown) each extending through a guide sleeve 136 mounted on the upper central portion of base 11. The lower end of each of the shafts 135 is engaged by a worm shaft 137, with each worm shaft 137 being disposed in meshing engagement with a worm gear 139. Each of the worm gears 139 is in turn in mesh with a drive gear 141, the two drive gears 141 being mounted upon a shaft 142 that extends transversely of base 11. Shaft 142 has a hand wheel 143 affixed thereto, making it possible to raise and lower the mold plate guide base 68 by operation of the hand wheel.

The vacuum sheet applicator 35 (FIGS. 1 and 3) corresponds fully to the construction described in the aforementioned application Ser. No. 513,737 of L. R. Richards and K. F. SAndberg; accordingly, only a brief description of this mechanism is presented herein. The sheet applicator includes a vacuum transfer shuttle 151 that is connected to the rod 86 for horizontal reciprocal movement in 1:1 synchronism with the movements of the mold plate 65. Shuttle 151 thus moves between a sheet-receiving position as shown in FIG. 3 and sheet discharge position in which the shuttle is located immediately below the knock-out cups 132 as shown in FIG. 6. Each time the shuttle moves to the position of FIG. 6, it carries with it a plurality of sheets of paper or like material 159, one for each mold cavity. The sheets 159 are engaged by the food patties as the patties are discharged from mold plate 65 by the knock-out cups 132; each patty dislodges one sheet from the shuttle and carries the sheet along to a stack on conveyor 36.

Sheet applicator 35 further includes a plurality of vacuum cups 152, two for each mold cavity, mounted upon a plate 153 that is secured to a shaft 154. Shaft 154 extends between two arms 155 located at opposite sides of the machine. Arms 155 are pivotally movable along an arcuate path, generally indicated by arrow P, about the pivotal axis defined by shaft 158. Shaft 154 is also rotated, when the arms 155 are pivoted, by means of a chain 156 engaging a sprocket on shaft 154 and also engaging a larger sprocket 157 on shaft 158. This mechanism pivots the vacuum cups 152 between the position shown in solid lines in FIG. 3 and the dash outline position 152′ to enable the vacuum cups to remove individual paper sheets from a series of supply magazines 161, there being one magazine 161 for each mold cavity 70 in mold plate 65.

The takeaway conveyor 36 is a conventional belt conveyor. The inner end of the conveyor belt engages a drive roller 163 and the outer end extends around an idler shaft 164 (FIG. 3). A separate electric drive motor (not shown) is provided for conveyor 36.

Figure 2:
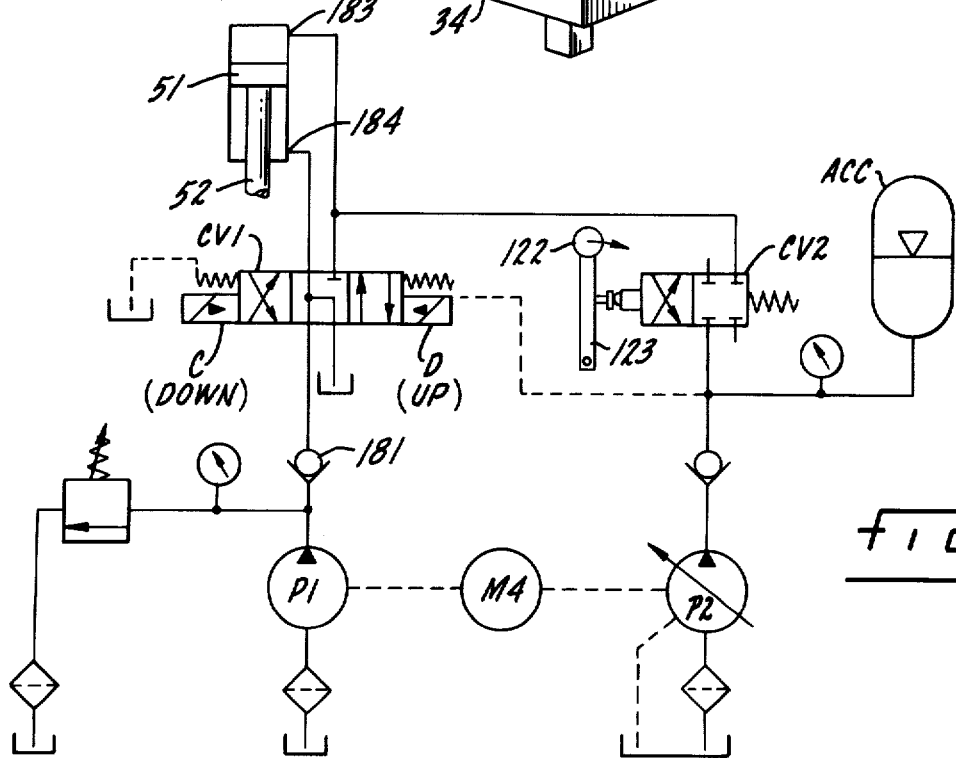
FIG. 2 is a schematic illustration of the hydraulic drive for the food pump in the machine of FIG. 1.

There are substantial advantages to utilization of a hydraulic drive for the plunger 48 of food pump 40. A simple yet highly effective hydraulic drive circuit is illustrated in FIG. 2. It comprises a motor M4 that is maintained continuously energized during normal operations of molding machine 10. Motor M4 drives both a low-pressure high-volume pump P1 and a high-pressure pump P2 of of limited volume.

Pump P1 is connected to a three-way control valve CV1 through a check valve 181. Valve CV1 is of the solenoid pilot operated return type, including an "up" solenoid D and a "down" solenoid C. The electrical controls for the two solenoids are arranged so that they cannot be energized simultaneously, as described hereinafter in connection with FIG. 8. When solenoid D is energized, the output from pump P1 is connnected to a lower port 184 of the hydraulic cylinder 51 and the upper port 183 of the cylinder is connected to a hydraulic reservoir. Conversely, when solenoid C is energized the output from the low pressure P1 is connected to the upper port 183 and the lower port 184 is returned to the reservoir.

The output of the high pressure P2 is connected to a valve CV2 actuated by lever 123 (see FIG. 3). In addition, the output P2 is connected to an accumulator ACC. When valve CV2 is actuated by lever 123, it connects the accumulator and the output P2 to the upper port 183 of the hydraulic cylinder 51.

In the general operation of molding machine 10, when molding food product patties, a supply of the food product from which the patties are to be molded is discharged into hopper 22 through the open top of the hopper. The food supply conveyor, in this instance comprising the feed screws 62, assures movement of the food supply down the sloping bottom of the supply hopper to a position at which the food product completely blocks the access port 46 to food pump 40 (FIG. 5 and 6) from the atmosphere. The conveyor feed screws 62 are not operated continuously because continuous operation would result in undue churning of the food product with resultant possible deterioration. Rather, the food supply conveyor is operated intermittently, only to an extent sufficient to maintain the food supply in blocking relation to access port 46.

When food patties are being molded, mold plate 65 is continuously driven through a reciprocating cycle. This cycle starts with the mold plate pulled to the left to a limit position shown in FIGS. 3 and 5. This is the fill position for the mold plate, with all of the mold plate cavities 70 aligned with the outlet port 45 of food pump 40 (FIGS. 3, 5 and 7). In this position, starting at the 0° position in FIGS. 9A and 9B, plunger 48 forces food product out of the lower portion 176 of chamber 44 through outlet port 45 and into the mold cavities 70. The actual fill time for the mold cavities is very short; the cavities are actually filled in the time that mold plate 65 completes its movement into fill position. A brief dwell (14°) is provided, however, to allow the vacuum cups 152 to deposit the paper sheets 159 on shuttle 151.

As the food product is pumped into mold cavities 70, it displaces the air in the mold cavities. The air is forced outwardly through the apertures 71 and the passageway 72, escaping through the passageway 73–77 into the bottom of hopper 22. Any food particles small enough to pass through the apertures 71 follow this same path back into the food product hopper.

From the fill position shown in FIGS. 3 and 5, which corresponds to the position shown in solid lines in FIG. 7, mold plate 65 is driven to the right, between guide plates 66 and 67, moving the mold cavities 70 away from communication with the outlet port 45 of food pump 40. This movement of the mold plate is effected by the cam drive linkage comprising cam 94 and levers 92, 89 and 87, together with the connection 88 to the yoke 32 that is connected to the left-hand end of the mold plate. As shown in FIG. 9A, the initial movement of mold plate 65 exhibits a gradual acceleration, with the mold plate speed increasing and then gradually slowing down until the mold plate reaches a discharge position with the mold cavities 70 aligned with the knock-out cups 132 (FIG. 6). The gradual acceleration and deceleration of the mold plate is quite desirable in minimizing wear and maintenance on the mold plate and mold plate drive. Mold plate 65 remains in the discharge position for a discharge dwell interval comprising approximately 50° of its operational cycle as shown in FIGS. 9A and 9B. The length of this dwell is determined by the contour of the cam track 95 in cam 94 (FIG. 3).

While mold plate 65 remains in its discharge position, cam 125 actuates lever 126 (FIG. 3), pivoting the lever in a clockwise direction about shaft 127 and pulling the knock-out drive rod 129 downwardly. This moves bar 131 and knock-out cups 132 downwardly so that the knock-out cups drive the molded food patties from the mold cavities 70. Before the downward movement of the knock-out cups, the paper feed shuttle 151 has moved from the position shown in FIG. 3 backward toward the discharge position for the mold plate and into the position shown in FIG. 6. Consequently, as each knock-out cup 132 drives a molded food patty downwardly from the cavity 70 in mold plate 65, the food patty engages a paper sheet 159 on shuttle 151 and the food patty and paper fall together onto a stack 173A on conveyor 36 (FIGS. 3 and 7). Shuttle 151 remains stationary below the knock-out cups 132 during the discharge dwell interval for mold plate 65 (FIG. 9B).

The cyclic movement of mold plate 65 resumes with the mold plate moving inwardly toward food pump 40, immediately followng the dwell interval at the discharge position. Correspondingly, shuttle 151 begins its outward movement toward the position shown in FIG. 3 to receive a new supply of paper sheets 159 for the next mold plate cycle (FIG. 9B). As illustrated in FIG. 9A, the inward movement of mold plate 65 again exhibits a gradual acceleration and a subsequent gradual deceleration, a characteristic established by the particular linkage utilized to drive the mold plate.

If plunger 48 of food pump 40 has moved down to the critical level 175 (FIG. 5) in filling mold cavities 70, an intake stroke for the plunger is again initiated to replenish the supply of food product in chamber 44. The pump intake stroke is completed during the time interval in which mold plate 65 is displaced from food pump 40 far enough so that mold cavities 70 are out of communication with the outlet port 45. The upward movement of plunger 48 is initiated after an appreciable movement of the mold plate has been effected, so that the food product in the patty molded in each of the cavities 70 will be under controlled pressure. Thus, as shown in FIGS. 9A and 9B, the upward movement of plunger 48 is begun at approximately $52\frac{1}{2}°$ of the mold plate cycle after the mold plate begins its outward movement.

The hydraulic system actuating the cylinder 51 that raises plunger 48 is constructed to provide a very rapid upward movement of the plunger; in molding machine 10, the actual rate of movement for plunger 48 is approximately 200 feet per minute. As a consequence, and because access port 46 is blocked entirely by the supply of food product in the lower end of hopper 22, an appreciable vacuum is developed in the lower part 176 of chamber 44. This draws the viscous, poorly flowing food product 61 inwardly of pump chamber 44 as indicated by the outline 61A in FIG. 6, in which plunger 48 is shown at the end of its upward movement in the "up ready" position for the pump. This is as far as the plunger moves in a normal intake stroke. Because of the poor flowing characteristics of the food product 61, it is essential that the access port 46 afford a large area, so that an adequate quantity of the food product will be drawn into chamber 44 as shown in FIG. 6.

From the up ready position, FIG. 6, plunger 48 is subsequently driven back downwardly through chamber 44. This movement is initiated before mold plate 65 reaches its discharge dwell position (see FIGS. 9A and 9B) in order to allow ample time for the plunger to move back down to an effective pressure position. The upward movement of plunger 48 is effected by supplying fluid at low pressure and high volume to the lower port 184 of cylinder 51 (FIG. 2) with the upper port 183 of the cylinder discharging to the reservoir, an action effected by energizing solenoid C (see FIG. 2). The changeover to downward movement of plunger 48 is effected by supplying fluid, again at low pressure and high volume, with the port connections reversed by valve CV1 so that oil is fed from pump P1 to cylinder port 183, whereas port 184 discharges to the reservoir. The downward movement of plunger 48 is substantially slower than its upward movement, particularly when plunger 48 encounters the food product 61A that has been drawn into pump chamber 44.

Later in the mold plate-pump cycle (see FIG. 9B), as mold plate 65 is moving back toward its fill position, the pump connections are changed with valve CV1 returning to its original position and valve CV2 actuated to connect the high pressure pump P2 to the upper port 183 of cylinder 51. This continues the downward movement of plunger 48 and places the food that has been drawn into chamber 44 under substantial pressure, ready for filling of the mold cavities 70.

In many instances, the pressure subchamber 176 constituting the lower part of pump chamber 44 has a volume that is substantially greater than the total volume of the mold cavities 70. In fact, the volume of the pressure subchamber 176 is preferably constructed to be several times greater than the total mold cavity volume. Thus, in the next mold cycle, after mold cavities 70 have been filled and mold plate 65 is moving outwardly towards its discharge position, there is no need to replenish the supply of food product in pump chamber 44. Under these circumstances, plunger 48 remains in the pressure position range, between the position shown in solid lines and the limit position 175 in FIG. 5. Valve CV1 is not actuated in this next cycle and pump P1 remains effectively disconnected from cylinder throughout the cycle. This is indicated by the dash lines used for the low pressure application portion of FIG. 9B. In the latter part of each cycle, however, the high pressure pump P2 is again connected to cylinder 51 through valve CV2 so that the pressure on the food product at the time of filling of the mold cavities will be the same as in the preceding cycle.

For uniformity of operation in filling the mold cavities 70, it is desirable to avoid pressure changes subsequent to filling of the mold cavities and to avoid application of excessive pressure to the food product. To this end, it is preferable to cut off the high pressure oil supply to cylinder 51 at valve CV2 (FIG. 2) and to leave both pumps P1 and P2 cut off from the cylinder for an interval immediately following the completion of the fill position dwell of mold plate 65 (see FIG. 9B). The actual duration of this dwell interval for plunger 48 (FIGS. 9A and 9B) can be adjusted empirically for different food products, depending to some extent upon the overall viscosity and other flow characteristics of the food product. The provision of this plunger dwell interval has been found to be of material assistance in eliminating any tendency toward uneven expansion of the food product in the mold cavities as the mold cavities emerge from between the guide plates 66 and 67 in the movement of mold plate 65 toward its discharge position (FIG. 6). In fact, it has been found that there is no necessity for special expansion or release chambers in the molding mechanism and that the lips and bulges that have affected previously known molding mechanisms can be avoided entirely.

Because outlet port 45 is of minimal length and connects the pump chamber directly to the mold cavities, the operating pressures required for pump 40 are maintained at a minimum. In a typical high volume machine, operating at a mold plate frequency of sixty cycles per minute, the overall pressure may be of the order of 50 pounds per square inch for hamburger and other similar food products. For molding machine 10, the fluid pressures for the inputs to cylinder 51, from pumps P1 and P2, can be established at about 475 psig and 2500 psig, respectively.

As noted above, the food supply conveyor screws 62 terminate a substantial distance S from the access port 46 to pump chamber 44 (FIGS. 5,6). With this construction, the food supply conveyor does not operate to force the food product into the access port, as with the positive feed mechanisms used in many previously known molding machines. Instead, the food supply conveyor functions only to maintain an adequate supply of the food product in a position that blocks the access port 46 from the atmosphere and prevents bridging of the food product within hopper 22. The food product is not driven positively into chamber 44, but rather is drawn into the chamber by the vacuum developed on the rapid withdrawl of plunger 48, avoiding the undesirable churning effects referred to above.

As with any food processing machine, molding machine 10 requires cleaning at frequent intervals. To allow access to pump chamber 44, plunger 48 may be raised to a cleaning position as generally indicated by line 48A in FIG. 6. When in the cleaning position, the plunger is withdrawn completely from chamber 44 to allow thorough washing of the entire chamber. It is for this same reason that the bottom 25 of hopper 22 is made readily removable from the hopper.

When it is desired to change mold plate 65, as for molding food patties of different size, the mold plate guide base 68 may be lowered by operation of handwheel 43 to the position 68' shown in phantom outline in FIG. 3. It is then a relatively simple matter to disconnect the mold plate from yoke 32, remove the mold plate, and replace it with another mold plate having mold cavities of the desired different size or shape.

Figure 8:
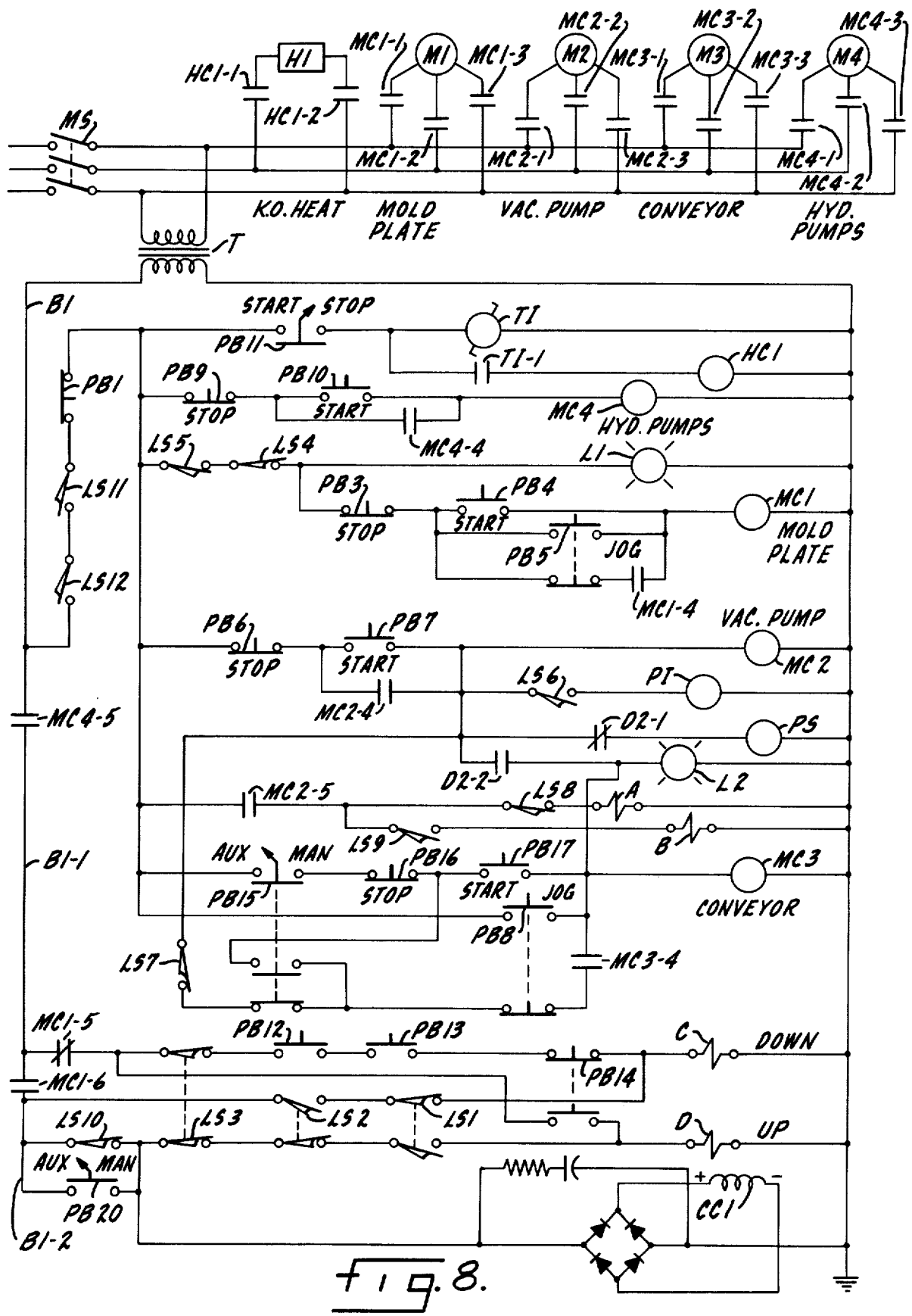
FIG. 8 is a schematic circuit diagram for the electrical controls of the food patty molding machine of FIGS. 1-7.

For a specific description of the control of molding machine 10, reference may be made to FIG. 8, comprising a schematic diagram of a complete electrical control circuit for the molding machine. In considering the operation of that control circuit, it may first be assumed that the main three-phase AC power line switch MS (FIG. 8) is closed, energizing the three main power lines at the top of the figure. Single-phase AC power is supplied through the transformer T to the AC control busses B1 and B3. Further, if the base cabinet doors (31,33,34, FIGS. 1 and 3) have been closed, the interlock switches LS11 and LS12 are closed and single-phase AC power is applied across the buses B2 and B3.

When molding machine 10 is placed in operation, a rotary start-stop switch PB11 (FIG. 8) is closed, energizing a cycle timer coil TI. Timer TI closes the contacts TI-1 periodically to energize a knock-out heater relay coil HCl. Each time coil HCl is energized, the contacts HCl-1 and HCl-2 are closed to energize a knock-out heater H1 that is connected across one of the phases of the main power lines. Switch PB11 remains in its closed "start" position at all times when the molding machine 10 is in operation. Heater H1 (FIG. 3) heats the knockout cups 132 to assure a clean knockout operation.

In placing machine 10 in operation, a start switch PB10 is also closed. This completes an operating circuit to a hydraulic pump motor control relay coil MC4. When coil MC4 is energized, the relay contacts MC4-1, MC4-2, and MC4-3 close to afford a three-phase power connection to the hydraulic pump motor M4. Motor M4 remains in continuous operation while molding machine 10 is in use. With coil MC4 energized, the contacts MC4-4 in parallel with switch PB10 close, affording a holding circuit for the hydraulic pump motor. The contacts MC4-5 are also closed, connecting the lower bus segment B1-1 to bus B1. A stop switch PB9 is provided to de-energize the hydraulic pump motor.

To start the cyclic operation of mold plate 65 (FIGS. 3-7), start switch PB4 is closed. Unless plunger 48 is in a cleaning position, limit switch LS4 (FIGS. 4, 8) is closed. If the side guard 171 for the knock-out mechanism is in position (see FIG. 1), switch LS5 is closed. Consequently, the closing of switch PB4 establishes an energizing circuit for a motor control relay coil MC1.

With coil MC1 energized, the contacts MC1-4 close to establish a holding circuit in parallel with switch PB4. The contacts MC1-1, MC1-2 and MC1-3 also close, energizing the mold plate drive motor M1 (FIG. 3) which remains energized as long as molding machine 10 remains in use. An indicator light L1 (FIG. 8) is provided to advise the machine operator that the plunger is in ready position, the side guards are down, and cabinet doors are closed.

The energization of coil MC1 also opens the contacts MC1-5 to prevent raising of the plunger 48 to its cleaning position. In addition, the contacts MC1-6 close, connecting the lower bus segment B12 to the B1 bus.

In some instances, it may be desirable to move mold plate 65 to a given position in its reciprocation cycle, as in checking the operation of the mold plate mechanism or when replacing plate 65 with a different mold plate. For this purpose, a mold plate jog switch PB5 is provided in the circuit of FIG. 8, in parallel with switch PB4. However, when switch PB5 is utilized to energize coil MC1, the holding circuit contacts MC1-4 are disconnected to prevent the mold plate mechanism from going into its cyclic reciprocation operation.

AC power is available at the left-hand side of a paper feed start switch PB7. Closing of switch PB7 energizes a vacuum pump motor control relay coil MC2 to close contacts MC2-1. MC2-2, and MC2-3 (FIG. 8) and thus energize a motor M2 that drives a vacuum pump (not shown) for sheet interleaver 35 (FIGS. 1,3). In addition, the contacts MC2-4 (FIG. 8) close, affording a holding circuit in parallel with switch PB7 and maintaining the vacuum pump motor M2 energized. The contacts MC2-5 also close, affording an energizing circuit for two solenoids A and B; these circuits extending through the timing switches LS8 and LS9 respectively. The solenoids A and B actuate the vacuum valves in the paper interleaver 35, with the timing for energization of the solenoids being controlled by mechanical actuation of switches LS8 and LS9. A stop switch PB6 can be actuated to shut off the sheet applicator 35 if desired. The operation of the vacuum sheet interleaver is described in detail in the copending application of L. R. Richards and K. F. Sandberg, Ser. No. 513,717, and hence is not repeated here.

The electrical control (FIG. 8) includes another switch LS6 that closes briefly in each cycle of the mold plate 65. Each time switch LS6 closes, a counter coil PI is energized. When coil PI has been energized a preset number of times, corresponding to the desired number of patties in a stack 173 (FIG. 3), contacts D2-1 are opened and contacts D2-2 are closed by the counter. The opening of contacts D2-1 de-energizes a counter reset coil PS to reset the counter for the next stack. The closing of contacts D2-2 completes an energizing circuit to a conveyor motor control relay coil MC3. An indicator lamp L2 is also energized each time coil MC3 is energized.

When coil MC3 is energized the contacts MC3-1, MC3-2 and MC3-3 close to complete a three-phase energizing circuit for the takeaway conveyor motor M3. This starts the takeaway conveyor 36 in operation (FIGS. 1,3). Contacts MC3-4 also close, completing a holding circuit for coil MC3 in parallel with contacts D2-2; this holding circuit extends through a limit switch LS7. At a subsequent point in the mold plate cycle, switch LS7 opens to interrupt operation of the conveyor by breaking the holding circuit to coil MC3, thus maintaining a desired spacing between stacks 173. To adjust the length of travel in each operation of the takeaway conveyor 36, the point in the mold plate cycle at which switch LS7 opens can be adjusted. On the other hand, the same effective control can be obtained by providing an adjustment for the speed of the conveyor drive.

For the foregoing description of the control of conveyor 36 (FIG. 3) it has been assumed that switch PB15 is in its "automatic" position as shown in FIG. 8. Manual control of the takeaway conveyor can be effected, however, by actuating switch PB15 to its "manual" position. With switch PB15 thus actuated, coil MC3 can be energized by closing a start switch PB17. With coil MC3 thus energized, contacts MC3-4 are closed and a holding circuit in parallel with switch PB17 is established through the intermediate contacts of switch PB15. For operation in this manner, switch LS7 is not in the operating circuit and interruption of the conveyor operation may be effected by opening a stop switch PB16. For limited operation of conveyor 36, a switch PB8 can be actuated, completing an energizing circuit for coil MC3 with contacts MC3-4 effectively disconnected so that no holding circuit is established.

The electrical controls for plunger 48 appear in the lower portion of FIG. 8. To raise the plunger to its cleaning position, coil MC4 must be energized to afford an electrical connection to bus B1-1 but coil MC1 must be de-energized so that motor M1 is de-energized and the mold plate mechanism is not in operation. Under these conditions, a switch PB14 can be actuated to complete an energizing circuit to the "up" solenoid D to drive the plunger to its uppermost cleaning position. On the other hand, if it is desired to lower the plunger, under the same operating conditions, two series-connected switches PB12 and PB13 may be closed to energize the "down" solenoid C and thus lower the plunger. When plunger 48 is raised to its cleaning position, switch LS4 is opened by rod 55 (see FIG. 4) to prevent energization of the mold plate motor control relay MC1 (FIG. 8).

When molding machine 10 is in normal operation, however, coil MC1 is energized so that contacts MC1-5 are open and contacts MC1-6 are closed. For these circumstances, energization of the solenoids C and D is controlled by the switches LS1, LS2, LS3, and LS10. In each cycle of the mold plate mechanism, switch LS1 is held in the position shown in FIG. 8 during a part of the cycle and is actuated to its opposite operating condition during another part of the cycle. This is also true of switch LS2; the timing for these switches relative to the mold plate cycle is shown in FIG. 9B. Switch LS3, on the other hand, is actuated from closed condition to open condition when plunger 48 reaches the top of its normal fill stroke, the "up ready" position of FIG. 6.

Switch LS10 (FIGS. 4,8) is also a limit switch that senses the position of plunger 48. Switch LS10 is held open except when the plunger is down below the given point 175 in pump chamber 44 (see FIG. 5) that indicates there is insufficient food product in the chamber for filling the mold cavities 70 another time.

In describing the control of plunger 48, it may first be assumed that the plunger is down, as shown in FIGS. 3–5, so that switch LS3 is closed, and that the food product supply in pump chamber 44 is low so that switch LS10 is also closed. Under these conditions, when mold plate 65 leaves its filling position in alignment with the pump chamber outlet 45, switch LS1 is actuated upwardly from the position shown in FIG. 8, while switch LS2 remains unchanged. As a consequence, an energizing circuit is established for the "up" solenoid D from bus B1-2 through switches LS10, LS3, LS2 and LS1 to bus B3. Accordingly, plunger 48 is raised.

When plunger 48 reaches its "up ready" position (FIG. 6), switch LS3 opens and de-energizes solenoid D (FIGS. 2,8). While plunger 48 is in its raised position, switch LS2 is actuated upwardly from the position shown in FIG. 8 and switch LS1 is actuated back downwardly to the position shown in that figure. When this occurs, an energizing circuit is established for solenoid C to initiate downward movement of the plunger. This circuit extends from bus B1-2 through switches LS2 and LS1 and solenoid C to bus B3. As the plunger moves downwardly, switch LS3 again closes, but cannot energize solenoid D because the connection to that solenoid through switch LS1 is presently open.

During the period following initiation of downward movement of the plunger, and while the mold plate is starting its return movement toward its fill position, switch LS2 is again actuated, being returned to the position shown in FIG. 8. This interrupts the energizing circuit for solenoid C but does not energize solenoid D because switch LS1 is not yet actuated and presents an open circuit in the connection to solenoid D. When switch LS2 has thus been actuated, the low pressure hydraulic control valve CV1 returns to its centered position as shown in FIG. 2 with no connection from pump P1 to cylinder 51. This provides a time interval in which high pressure hydraulic fluid can be supplied to cylinder 51 from pump P2, through valve CV2, as described in connection with FIGS. 2 and 9B.

When the mold cavities 70 have been filled and mold plate 65 again moves outwardly from its fill position toward its discharge position (see FIGS. 9A,9B), switch LS1 is again actuated upwardly from the illustrated position (FIG. 8) to start a new cycle, unless other conditions in the circuit have changed.

Whenever the supply of food product in the lower portion of pump chamber 44 is adequate for filling the mold cavities 70 at least one more time, the plunger position sensing switch LS 10 is held open. Under these circumstances, plunger 48 cannot be actuated through the operational steps described above because the energizing circuit for the "up" solenoid D cannot be completed. Until the supply of food product in the pump chamber is depeleted to a level that allows switch LS10 to close, pump 40 does not perform an intake stroke; this state of operation may continue through a number of mold plate cycles, as described above.

Switch LS10 also controls the drive for feed screws 62 whenever the switch PB20 is in its "automatic" position as illustrated in FIG. 8. Under these conditions, the operating coil CC1 for the electrical clutch in the feed screw drive is energized only when switch LS10 is closed, indicating a low food product supply in pump chamber 44 with consequent necessity for an intake stroke of plunger 48 in pump 40. On the other hand, whenever switch LS10 is open, indicating a sufficient supply of food product in the pump chamber for filling the mold cavities at least one more time, the energizing circuit for coil CC1 is open and the feed screw drive is effectively disabled. The timing of the feed screw operation relative to the mold plate cycle is controlled by the crank arm drive 104–109 (FIG. 3) and this timing is illustrated in FIG. 9B.

Under some circumstances, it may be desirable to bypass operation of switch LS10 and to have the pump 40 and the feed screw drive operate in a 1:1 basis relative to the cyclic operation of the mold plate. To this end, switch PB20 may be actuated to its "manual" closed position, shunting switch LS10. When this has been done, pump 40 is driven through a complete intake cycle, by energization of solenoids C and D, in each mold plate cycle, independently of the quantity of food product in pump chamber 44.

For the particular electrical control illustrated in FIG. 8, switches LS1, LS2, LS6, LS7, LS8 and LS9 are all rotary control switches actuated from the mold plate drive; see FIG. 3. The mechanical take-off for these switches may be made at various points in the mold plate drive mechanism. All of the switches may be conveniently actuated from the drive shaft for the knock-out mechanism. Switches LS3, LS4 and LS10, on the other hand, are all sensing switches that sense the position of plunger 48 (see FIG. 4). Switch LS5 is also a sensing switch, used as a safety interlock, that senses whether the knock-out guard 171 (FIG. 1) is in place. Switches LS11 and LS12 are door interlock switches used for safety purposes and are closed during normal operation of the machine. Switch PB1 is a "panic" stop switch that may be used to shut down molding machine 10 under emergency conditions.

We claim:

1. A food patty molding machine comprising:
   a pump housing enclosing a tall, narrow, elongated pump chamber having an outlet port extending longitudinally of one edge of the chamber and an access port extending longitudinally of one side of the chamber, the access port having a height greater than the width of the pump chamber;
   a mold plate including a plurality of mold cavities;
   a mold plate drive for cyclically moving the mold plate between a fill position, in which the mold cavities are aligned with the outlet port, and a discharge position, in which the mold cavities are displaced from the outlet port, with a dwell interval at each position;
   supply means for continuously maintaining a supply of food product completely covering the access port;
   a plunger projecting into the pump chamber through the edge opposite the outlet port and movable between an intake position, in which the plunger is displaced from the outlet port to a point clear of the access port, and a range of pressure positions, in which the plunger extends past and completely closes the access port;
   plunger drive means driving the plunger to maintain food product under essentially uniform pressure when the plunger is in its pressure position range, the plunger drive means comprising a reversible fluid pressure motor connected to the plunger and fluid pressure means for supplying fluid, under pressure, to the motor;

and control means for actuating the plunger drive means through an operating cycle synchronized with the mold plate cycle, moving the plunger from its pressure position range to its intake position and back into its pressure position range during a period in which the mold plate is displaced from its fill position, the plunger moving toward its intake position at a speed sufficient to develop a partial vacuum in the chamber and thereby draw food product from the supply means a short distance through the access port with no appreciable external impetus.

2. A food patty molding machine according to claim 1, in which the control means includes means for maintaining the fluid pressure means cut off for a predetermined plunger dwell interval synchronized with the mold plate fill dwell interval.

3. A food patty molding machine according to claim 2, in which the plunger dwell-determining means is adjustable, affording means to adjust the plunger dwell interval from zero to an appreciable portion of the plunger cycle time.

4. A food patty molding machine according to claim 1, in which the plunger drive motor is a hydraulic cylinder, and in which the control means comprises plunger position responsive means for inhibiting movement of the plunger to its intake position in any cycle following a cycle in which the plunger has not penetrated to a given position in its pressure position range.

5. A food patty molding machine according to claim 1 in which the fluid pressure means comprises a low pressure fluid supply and a high pressure fluid supply, and in which the control means connects the low pressure supply to the motor to drive the plunger from its intake position toward its pressure position range and subsequently connects the high pressure supply to the motor to drive the plunger further into its pressure position range to pump food product through the outlet port into the mold cavities.

6. A food patty molding machine according to claim 5, in which the motor is a hydraulic cylinder having a piston connected to the plunger, and in which the control means maintains all of the fluid pressure means inactive for a plunger dwell interval of adjustable duration immediately subsequent to the mold plate fill dwell interval.

7. A food patty molding machine according to clam 1, in which the supply means comprises:

a food product storage hopper having a bottom surface extending toward and terminating at the lower edge of the access port for the pump housing, the bottom of the hopper having a width approximately equal to the pump chamber length;

and supply conveyor means located in the bottom of the hopper for conveying food product to the access port, the conveyor means terminating an appreciable distance from the access port;

the control means actuating the supply conveyor means during only a limited portion of each of those plunger operating cycles that include movement of the plunger to its intake position.

8. A food patty molding machine according to claim 7, in which the supply conveyor means comprises a plurality of feed screws extending along the hopper bottom toward the access port and each terminating a substantial distance from the access port.

9. A food patty molding machine according to claim 7, in which the control means includes plunger position sensing means for sensing the penetration of the plunger into its pressure position range, and in which said control means inhibits movement of the plunger to its intake position and inhibits operation of the supply conveyor in any operating cycle following a cycle in which the plunger has not penetrated to a given point in its pressure position range.

10. A food patty molding machine according to claim 1, in which the mold plate drive comprises:

a continuously driven rotary cam having a cam track;

a cam follower engaging the cam track and moved in a reciprocating motion by the cam;

and a connecting linkage connected the cam follower to the mold plate to move the mold plate cyclically between its fill position and its discharge position, the cam track being contoured to afford an appreciable dwell interval for the cyclic motion of the mold plate, with the mold plate at its discharge position, and thereby assure sufficient time for discharge of molded food patties from the mold cavities.

11. A food patty molding machine according to claim 10, in which:

the cam track comprises an annular groove in the face of the cam, eccentrically oriented relative to the axis of the cam;

and the cam follower comprises a drive lever mounted for sliding movement along a path intersecting the axis of the cam, and a follower roller mounted on the drive lever and engaged in the cam track groove.

12. The method of molding food patties comprising the following steps performed in a repeating full cycle:

continuously maintaining a supply of food product in a position completely blocking a large-area access port leading directly into a narrow pump chamber;

rapidly withdrawing a plunger from the chamber, past the access port, at a speed of at least 150 feet per minute, from a pressure position range within the chamber in which the plunger completely closes the access port, to an intake position in which te access port is open into the chamber, producing a partial vacuum in the chamber and drawing a quantity of food product a short distance from the supply through the access port into the chamber;

moving the plunger back into the chamber past the access port into its pressure position range, completely closing the access port and placing the food product under uniform pressure within a subportion of the chamber at the opposite edge of the chamber from the plunger intake position;

bringing a mold cavity into a fill position in communication with an outlet port for the chamber, with the plunger in its pressure position range, to fill the mold cavity with the food product and form a food patty while maintaining essentially uniform pressure on the food product;

and moving the mold cavity away from its fill position and out of communication with the outlet port to a discharge position at which the food patty is discharged from the mold cavity.

13. The method of molding food patties, according to claim 12, in which an abbreviated molding cycle following the movement of the mold cavity to discharge position is effected with the following steps:

advancing the plunger further into its pressure position range without withdrawing the plunger from that range;

again bringing the mold cavity to fill position to form a food patty under essentially uniform pressure;

and again moving the mold cavity to its discharge position.

14. The method of molding food patties, according to claim 17, comprising the following additional steps:

sensing the penetration of the plunger into its pressure position range;

repeating the abbreviated cycle, by further advancing the plunger, again bringing the mold cavity to fill position, and again moving the mold cavity to discharge position, until the plunger has penetrated past a given point in the chamber subportion;

and thereafter initiating a new full cycle by rapid withdrawal of the plunger from the chamber, past the access port.

15. The method of molding food patties, according to claim 12, in which the bringing of the mold cavity into fill position is effected with an overlap interval coincident with the placing of the food product under pressure by movement of the plunger into its pressure position range.

16. The method of molding food patties, according to claim 15, utilizing a fluid pressure motor to move the plunger, including the additional step of shutting off the fluid pressure input to the motor for a release interval comprising a part of the cycle immediately following movement of the plunger into its pressure position range and prior to movement of the mold cavity out of communication with the outlet port.

* * * * *